(12) United States Patent
Balassiano (10) Patent No.: US 12,541,341 B2
(45) Date of Patent: Feb. 3, 2026

(54) METHOD FOR INCORPORATING A BUSINESS RULE INTO AN SAP-CUSTOMIZED APPLICATION ON AN SAP CLOUD PLATFORM OR ON-PREMISE SOLUTION

(71) Applicant: TACHYONIX LTD., Netanya (IL)

(72) Inventor: Rogerio Balassiano, Modi'in Maccabim Re'ut (IL)

(73) Assignee: TACHYONIX LTD., Netanya (IL)

( * ) Notice: Subject to any disclaimer, the term of this patent is extended or adjusted under 35 U.S.C. 154(b) by 230 days.

(21) Appl. No.: 17/920,367

(22) PCT Filed: Apr. 22, 2020

(86) PCT No.: PCT/IL2020/050463
§ 371 (c)(1),
(2) Date: Oct. 20, 2022

(87) PCT Pub. No.: WO2021/214741
PCT Pub. Date: Oct. 28, 2021

(65) Prior Publication Data
US 2023/0168866 A1 Jun. 1, 2023

(51) Int. Cl.
*G06F 9/44* (2018.01)
*G06F 8/30* (2018.01)
(Continued)

(52) U.S. Cl.
CPC . *G06F 8/30* (2013.01); *G06F 8/34* (2013.01)

(58) Field of Classification Search
CPC .................................. G06F 8/30; G06F 8/34
See application file for complete search history.

(56) References Cited

U.S. PATENT DOCUMENTS

| 9,742,835 | B2 * | 8/2017 | Chadzelek | G06F 9/451 |
| 9,760,343 | B2 * | 9/2017 | Noens | G06F 8/33 |
| 2015/0040099 | A1 | 2/2015 | Mall et al. | |
| 2016/0092778 | A1 | 3/2016 | Graham et al. | |

(Continued)

FOREIGN PATENT DOCUMENTS

EP 3474135 A1 * 4/2019 ............... G06F 8/38

OTHER PUBLICATIONS

Greg Van Wormer, Document Management for Design Engineering, Construction, and Owner Operators for the New Enterprise, 2017, pp. 1-8 https://ieeexplore.ieee.org/stamp/stamp.jsp?tp=&arnumber=8003856 (Year: 2017).*

(Continued)

*Primary Examiner* — Mongbao Nguyen
(74) *Attorney, Agent, or Firm* — The Roy Gross Law Firm, LLC; Roy D. Gross (57) ABSTRACT

A process is provided for developing customized applications on an SAP S4/HANA platform, the process employs a gallery of customized SAPUI5 application templates and a visual programming environment associated with an application-builder that dynamically creates the CDS, Gateway, and BOPF. The process produces fully developed, customized, SAP-native coded applications, with little or no writing of code required. Furthermore, an additional process is provided for automatically transforming the presentation of requested data stored on an SAP ECC legacy database to a graphical, responsive, fully SAPUI5-supported environment.

10 Claims, 7 Drawing Sheets

(51) Int. Cl.
  *G06F 8/34* (2018.01)
  *G06F 9/445* (2018.01)
  *G06F 9/45* (2006.01)
  *G06F 9/455* (2018.01)

(56) References Cited

U.S. PATENT DOCUMENTS

| | | | |
|---|---|---|---|
| 2016/0188302 A1* | 6/2016 | Fredrick | G06F 8/34 |
| | | | 717/107 |
| 2016/0321034 A1* | 11/2016 | Yen | G06F 8/20 |
| 2017/0168918 A1* | 6/2017 | Wieczorek | H04L 67/02 |
| 2017/0286067 A1* | 10/2017 | Eberlein | G06F 8/36 |
| 2017/0286130 A1* | 10/2017 | Eska | G06F 9/451 |
| 2017/0289731 A1 | 10/2017 | Kamineni et al. | |
| 2017/0322782 A1* | 11/2017 | Pakiman | G06F 8/33 |
| 2019/0065014 A1 | 2/2019 | Richter et al. | |
| 2019/0188297 A1* | 6/2019 | Goyal | G06F 9/451 |
| 2019/0377557 A1 | 12/2019 | Dibbern et al. | |
| 2019/0391825 A1* | 12/2019 | Jann | G06F 3/0482 |
| 2020/0257507 A1* | 8/2020 | Jaiswal | G06F 16/284 |
| 2021/0209501 A1* | 7/2021 | Sarferaz | G06F 9/547 |
| 2021/0382880 A1* | 12/2021 | Raev | G06F 16/245 |

OTHER PUBLICATIONS

English translation, Stephan Florian (EP 3474135 A1), 2019, pp. 1-24. (Year: 2019).*
Fanni Rankl, SAP Screen Personas Applications for Postimplementation Business Requirements, 2018, pp. 451-455. https://ieeexplore.ieee.org/stamp/stamp.jsp?tp=&arnumber=8399672 (Year: 2018).*
Dilip Kumar Krishnadev Pandey (2017). SAP Fiori Standard App Implementation. SAP Blogs, Nov. 10, 2017. Available online at: https://blogs.sap.com/2017/11/10/sap-fiori-app-implementation-standard-apps/.
Sanchis R, García-Perales Ó, Fraile F, Poler R. Low-Code as Enabler of Digital Transformation in Manufacturing Industry. Applied Sciences. 2020; 10(1):12. https://doi.org/10.3390/app10010012.
PCT International Search Report for International Application No. PCT/IL2020/050463, mailed Jul. 2, 2020, 5pp.
PCT Written Opinion for International Application No. PCT/IL2020/050463, mailed Jul. 2, 2020, 6pp.
PCT International Preliminary Report on Patentability for International Application No. PCT/IL2020/050463, issued on Aug. 22, 2022, 22pp.

* cited by examiner

| IDENTIFYING METADATA FIELDS OUTPUT STRUCTURE OF AN ALV ABAP REPORT OUTPUT STRUCTURE | ~ 305 |

| IDENTIFYING METADATA FIELDS INPUT STRUCTURE OF THE ALV ABAP REPORT INPUT STRUCTURE | ~ 310 |

| IDENTIFYING SEARCH FILTERS OF THE INPUT STRUCTURE | ~ 315 |

| DEFINING LOGICAL KEYS FOR DISPLAY OF DATA | ~ 320 |

| CONSTRUCTING AN ABAP BASE STRUCTURE | ~ 325 |

| CONSTRUCTING A CDS WRAPPER LINKED TO THE ABAP BASE STRUCTURE | ~ 330 |

| EXPOSING THE CDS WRAPPER FOR THE ODATA PROTOCOL | ~ 335 |

| REGISTERING THE CDS WRAPPER AS AN HTTP-ODATA SERVICE WITH A DISPATCHER OF AN ECC-ERP DATABASE | ~ 340 |

METHOD FOR INCORPORATING A
BUSINESS RULE INTO AN
SAP-CUSTOMIZED APPLICATION ON AN
SAP CLOUD PLATFORM OR ON-PREMISE
SOLUTION

CROSS REFERENCE TO RELATED
APPLICATIONS

This application is a National Phase of PCT/IL2020/050463 having International filing date of Apr. 22, 2020, the contents of which are all incorporated herein by reference in their entirety.

FIELD OF THE INVENTION

The invention is in the field of computer programming models and platforms, and in particular to providing SAP-platform customizations and modern functionality while maintaining backward-compatibility to earlier generations of ERPs.

BACKGROUND TO THE INVENTION

The publication, "Low-Code as Enabler of Digital Transformation in Manufacturing Industry" (Sanchis, et al.; Applied Sciences; 10 (1):12•December 2019) describes various functionalities of a virtual factory operating systems (vf-OS). Among them are a virtual factory input/output interface (vf-IO), composed of modules that enable connectivity to legacy enterprise resource planning (ERP) systems; and application programming interfaces (APIs), interconnection modules, and drivers that enable integration between a factory and vf-OS applications and interface of ERP systems and data with physical assets.

The invention described below improves the state-of-the-art in SAP customization and ERP interoperability, as further described below.

SUMMARY

An aspect of the invention relates to a process for developing customized applications on an SAP S4/HANA platform-on-premises and/or cloud-based.

In some embodiments, the process employs a gallery of customized SAPUI5 application templates and a visual programming environment associated with an application-builder that dynamically creates the core data services (CDS), Gateway, and business object processing framework (BOPF).

The process produces fully developed, customized, SAP-native coded applications, with little or no writing of code required.

The customized applications developed by the process are updated to SAP S4/HANA engine, providing the best possible performance and enabling organizations to accelerate migration to the SAP S4/HANA business suite. Typically, coding required is basically only at a high business-rules level of programming, enabling business and IT teams to collaborate in real time so they can develop applications faster that possible with raw programming tools presently available for traversing the SAP backbone.

The customized application templates comprise visual models that enable the application-building algorithm to quickly connect with and consume target data. In some embodiments, the application templates and application-building algorithms are responsive across ecosystems of multiple types of devices (e.g., Windows, iphone, Android, etc.).

Another aspect of the invention relates to a process for automatically transforming the presentation of requested data stored on an SAP ECC legacy database—which, using standard SAP tools, is only displayable on a desktop computer as a tabular ALV report—to a graphical, responsive (operable on any type of device, desktop and mobile), fully SAPUI5-supported environment.

It is within the scope of the invention to provide a process for developing a customized application on an SAP platform, comprising
  a. user steps for creating the application, comprising
    i. creating a customized application;
    ii. selecting one or more data sources;
    iii. defining relationships between the data sources;
    iv. defining relationships between screen actions and business rules;
    v. selecting master data, from the data sources, to be displayed; and
    vi. for each screen of detail data to be displayed, selecting the detail data from the master data; and
  b. automated steps for building the user-created application, comprising
    i. constructing a master structure comprising metadata fields of the master data;
    ii. constructing a general CDS comprising the master data and the detail data;
    iii. constructing a first specific CDS comprising the master structure populated by the general CDS;
    iv. linking the screen actions to the business rule, by constructing a specific BOPF configured for management of calls of each screen action, employing the master structure;
    v. adjusting method parameters for each class associated with one of the screen actions, thereby formulating parameters of the master structure; and
    vi. for each of the detail data, constructing a second specific CDS.

It is further within the scope of the invention to provide the abovementioned process for developing a customized application on an SAP platform, wherein the step of creating a customized application comprises
  a. selecting or creating a customized application template; and
  b. adding basic information to the application template.

It is further within the scope of the invention to provide any one of the abovementioned processes for developing a customized application on an SAP platform, wherein the data sources comprise physical tables, SAP CDSs, or any combination thereof.

It is further within the scope of the invention to provide any one of the abovementioned processes for developing a customized application on an SAP platform, wherein the user steps further comprises defining one or more filters on the data sources.

It is further within the scope of the invention to provide any one of the abovementioned processes for developing a customized application on an SAP platform, wherein at least one of the steps of selecting master data and selecting detail data from the master data is implemented by drag-and-drop.

It is within the scope of the invention to provide a process for transforming the presentation of requested data stored on an SAP ECC-ERP database to an SAPUI5 environment, comprising a. steps for establishing a CDS wrapper, comprising
   i. constructing an Advanced Business Application Programming (ABAP) base structure comprising metadata fields of an output structure;
   ii. constructing a CDS wrapper linked to the ABAP base structure;
b. runtime steps comprising
   i. identifying the CDS wrapper in a database request;
   ii. forwarding the database request to a conversion interpreter;
   iii. transforming a query in the database request to ABAP; and
   iv. transforming a query response in the database response to a simulated database response; and It is further within the scope of the invention to provide the abovementioned process for transforming the presentation of requested data stored on an SAP ECC-ERP database to an SAPUI5 environment, wherein the steps for establishing a CDS wrapper further comprise steps of
a. deriving the metadata fields of the output structure from an ALV ABAP report;
b. identifying metadata fields of an input structure of the report; and
c. defining one or more logical keys for display of data.

It is further within the scope of the invention to provide the previous process for transforming the presentation of requested data stored on an SAP ECC-ERP database to an SAPUI5 environment, wherein the steps for establishing a CDS wrapper further comprise a step of identifying search filters of the input structure.

It is further within the scope of the invention to provide any of the abovementioned processes for transforming the presentation of requested data stored on an SAP ECC-ERP database to an SAPUI5 environment, wherein the steps for establishing a CDS wrapper are followed by steps of
a. exposing the CDS wrapper for the ODATA protocol; and
b. registering the CDS wrapper as an HTTP-ODATA service with a dispatcher of an SAP ECC-ERP database.

It is further within the scope of the invention to provide any of the abovementioned processes for transforming the presentation of requested data stored on an SAP ECC-ERP database to an SAPUI5 environment, wherein after the step of transforming the query to ABAP, the runtime steps further comprise
a. producing a new logical work unit;
b. forwarding the new logical work unit to an ALV report execution module, configured to forward a DB request to an SAP ECC database and receive a DB response from the database; and
c. allocating the DB response to a shared memory;
further wherein after the step of transforming the query response in the database response to the simulated database response, the runtime steps further comprise a step of
d. forwarding the simulated database response to the CDS module.

It is further within the scope of the invention to provide one or more non-transitory computer-readable media (CRMs), storing instructions to one or more processors for implementation of a process for developing a customized application on an SAP platform, comprising
a. enabling user steps for creating the application, comprising
   i. creating a customized application;
   ii. selecting one or more data sources;
   iii. defining relationships between the data sources;
   iv. defining relationships between screen actions and business rules;
   v. selecting master data, from the data sources, to be displayed; and
   vi. for each screen of detail data to be displayed, selecting the detail data from the master data; and
b. automated steps for building the user-created application, comprising
   i. constructing a master structure comprising metadata fields of the master data;
   ii. constructing a general CDS comprising the master data and the detail data;
   iii. constructing a first specific CDS comprising the master structure populated by the general CDS;
   iv. linking the screen actions to the business rule, by constructing a specific BOPF configured for management of calls of each screen action, employing the master structure;
   v. adjusting method parameters for each class associated with one of the screen actions, thereby formulating parameters of the master structure; and
   vi. for each of the detail data, constructing a second specific CDS.

It is further within the scope of the invention to provide the abovementioned CRMs storing instructions to one or more processors for implementation of a process for developing a customized application on an SAP platform, wherein the step of creating a customized application comprises
a. selecting a customized application template; and
b. adding basic information to the application template.

It is further within the scope of the invention to provide any of the abovementioned CRMs storing instructions to one or more processors for implementation of a process for developing a customized application on an SAP platform, wherein the data sources comprise physical tables, SAP CDSs, or any combination thereof.

It is further within the scope of the invention to provide any of the abovementioned CRMs storing instructions to one or more processors for implementation of a process for developing a customized application on an SAP platform, wherein the user steps further comprises defining one or more filters on the data sources.

It is further within the scope of the invention to provide any of the abovementioned CRMs storing instructions to one or more processors for implementation of a process for developing a customized application on an SAP platform, wherein at least one of the steps of selecting master data and selecting detail data from the master data is implemented by drag-and-drop.

It is further within the scope of the invention to provide one or more non-transitory computer-readable media (CRMs), storing instructions to one or more processors for implementation of a process for transforming the presentation of requested data stored on an SAP ECC-ERP database to an SAPUI5 environment, comprising
a. steps for establishing a CDS wrapper, comprising
   i. constructing an ABAP base structure comprising metadata fields of an output structure;
   ii. constructing a CDS wrapper linked to the ABAP base structure;
b. runtime steps comprising
   i. identifying the CDS wrapper in a database request;
   ii. forwarding the database request to a conversion interpreter;
   iii. transforming a query in the database request to ABAP; and iv. transforming a query response in the database response to a simulated database response; and It is further within the scope of the invention to provide the abovementioned CRMs storing instructions to one or more processors for implementation of a process for transforming the presentation of requested data stored on an SAP ECC-ERP database to an SAPUI5 environment, wherein the steps for establishing a CDS wrapper further comprise steps of
  a. deriving the metadata fields of the output structure from an ALV ABAP report;
  b. identifying metadata fields of an input structure of the report; and
  c. defining one or more logical keys for display of data.
  d. database response; and It is further within the scope of the invention to provide any one of the abovementioned CRMs storing instructions to one or more processors for implementation of a process for transforming the presentation of requested data stored on an SAP ECC-ERP database to an SAPUI5 environment, wherein the steps for establishing a CDS wrapper further comprise a step of identifying search filters of the input structure.

It is further within the scope of the invention to provide any one of the abovementioned CRMs storing instructions to one or more processors for implementation of a process for transforming the presentation of requested data stored on an SAP ECC-ERP database to an SAPUI5 environment, wherein the steps for establishing a CDS wrapper are followed by steps of
  a. exposing the CDS wrapper for the ODATA protocol; and
  b. registering the CDS wrapper as an HTTP-ODATA service with a dispatcher of an SAP ECC-ERP database.

It is further within the scope of the invention to provide any one of the abovementioned CRMs storing instructions to one or more processors for implementation of a process for transforming the presentation of requested data stored on an SAP ECC-ERP database to an SAPUI5 environment, wherein after the step of transforming the query to ABAP, the runtime steps further comprise
  a. producing a new logical work unit;
  b. forwarding the new logical work unit to an ALV report execution module, configured to forward a DB request to an SAP ECC database and receive a DB response from the database; and
  c. allocating the DB response to a shared memory;
  further wherein after the step of transforming the query response in the database response to the simulated database response, the runtime steps further comprise a step of
  d. forwarding the simulated database response to the CDS module.

DETAILED DESCRIPTION

Definitions

Data source: Specified data in an ERP database.

Basic information: The information supplied by a data source in order to create an application (e.g., application name, objects, features, requests).

Standard CDS: A CDS created by SAP

Data source: A table or standard CDS.

Figure 1A:
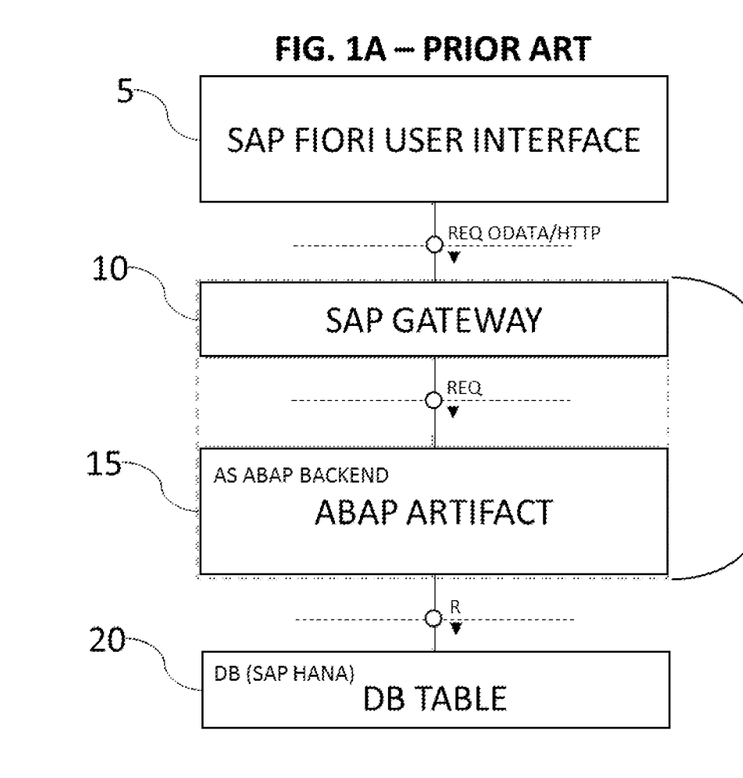
FIG. 1A shows an overview of the application development process of the SAP ABAP Fiori programming model.

Reference is now made to FIG. 1A, showing a high-level overview of the application development process in the SAP Fiori programming model. A developer uses an SAP Fiori user interface 5 to access an SAP gateway 10, creating an ABAP artifact 15 to traverse the 250 AS ABAP backend and consume data in an SAP HANA database table 20.

Figure 1B:
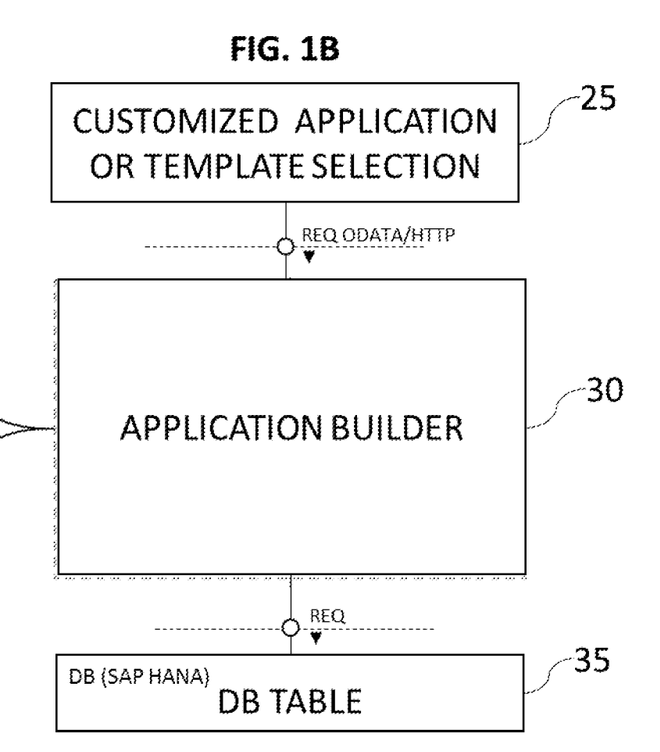
FIG. 1B shows an overview of the application development process according to some embodiments of the present invention.

Reference is now made to FIG. 1B, showing an overview of the application development process according to some embodiments of the present invention. A developer/user creates a customized application 25. In preferred embodiments of the invention, the user/developer selects from a library of customized application templates (or 255 creates a customized application template) and then specifies parameters needed by the application. An application builder 30 receives the developer's selected template and specified parameters, and then builds the application suited to consume data in an SAP HANA database table 35.

Figure 2:
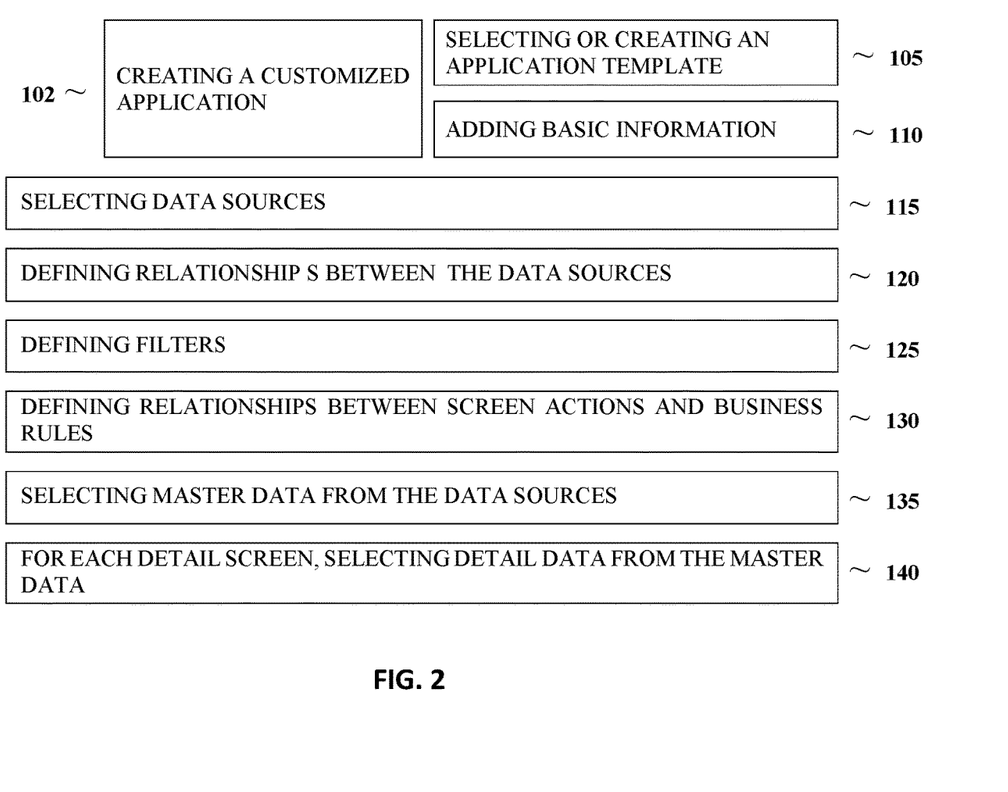
FIG. 2 lists user steps for creating a customized SAP application, according to some embodiments of the invention.

Reference is now made to FIG. 2, listing steps for user creation of an SAP application 100, according to some embodiments of the invention.

User creation of an SAP application 100 comprises steps of
  a. Creating a customized application 102, which may be done by:
    i. Selecting or creating a customized application template 105.
    ii. Adding basic information to the application template 110. The basic information comprises information supplied during runtime by data source in an ERP database; for example, application name, objects, features, requests, or any combination thereof.
  b. Selecting the data sources 115; for example, a table, a CDS, or any combination thereof.
  c. Defining relationships between the data sources 120.
  d. If needed, defining one or more filters on the data sources 125.
  e. Defining relationships between screen actions and business rules 130.
  f. Selecting fields of master data to be displayed, from the data sources 135. In preferred embodiments, the user employs a GUI, such as by a drag-and-drop method, to make the master data field selections.

g. For each detail screen, selecting fields of detail data to be displayed, from the master data 140. In preferred embodiments, the user employs a GUI, such as by a drag-and-drop method, to make the detail data field selections.

Figure 3:
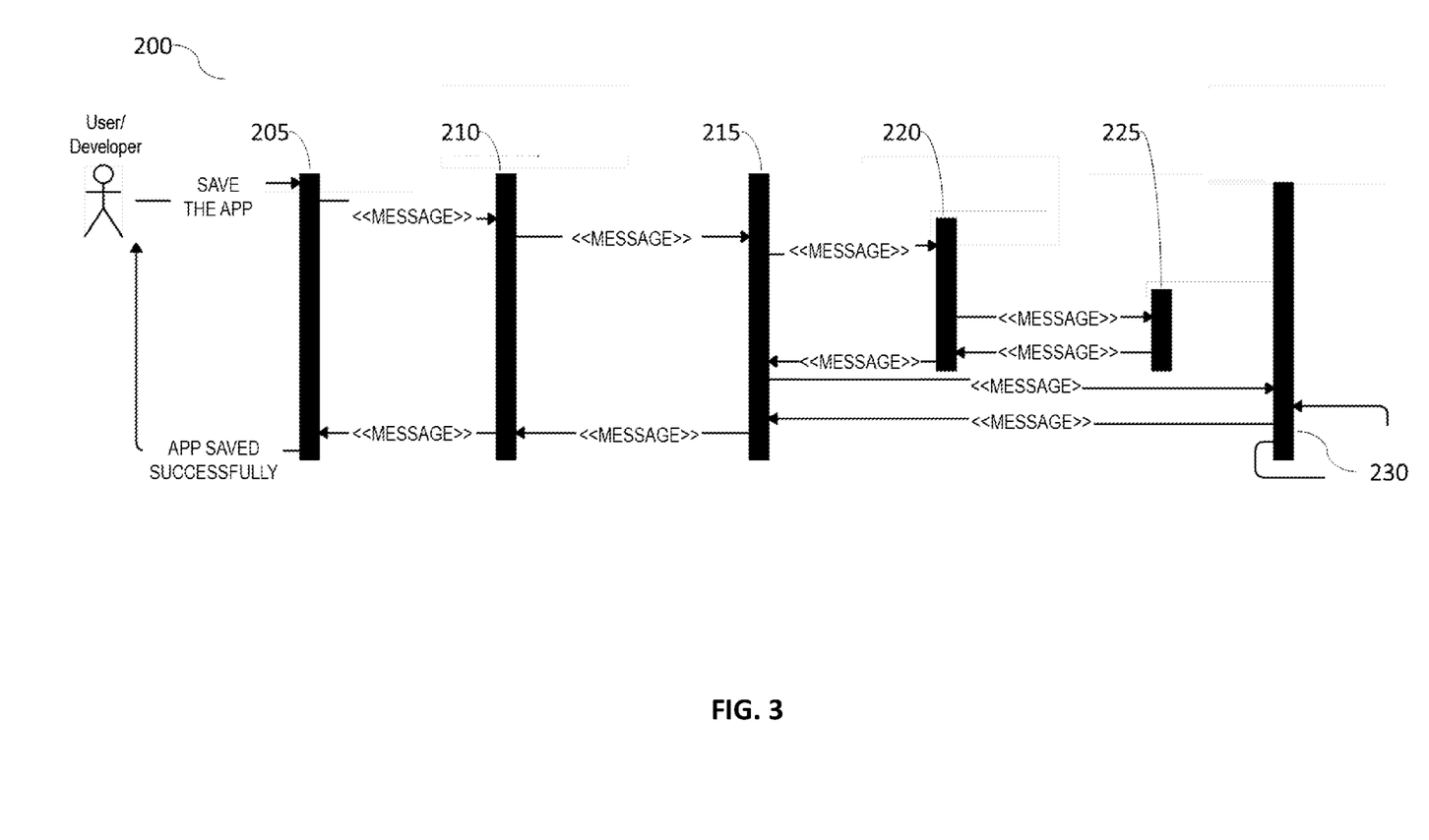
FIG. 3 shows automated steps for building a user-created SAP application, according to some embodiments of the invention.

Reference is now made to FIG. 3, listing automated steps for building a user-created SAP application, according to some embodiments of the invention.

Upon completing creation of the application, the user/developer, in a typical embodiment, will save the applications, prompting automated building of a user-created SAP application 200, comprises steps of:

a. Constructing a master structure comprising metadata fields of the master data 205.
b. Constructing a general CDS comprising the master data and the detail data 210.
c. Constructing a first specific CDS comprising the master structure populated by the general CDS 215.
d. Linking the screen actions to the business rule, by constructing a specific BOPF configured for management of calls of each screen action, employing the master structure 220.
e. Adjusting method parameters for each class associated with one of the screen actions, thereby formulating parameters of the master structure 225.
f. For each detail data, constructing a second specific CDS 230.

Figure 4:
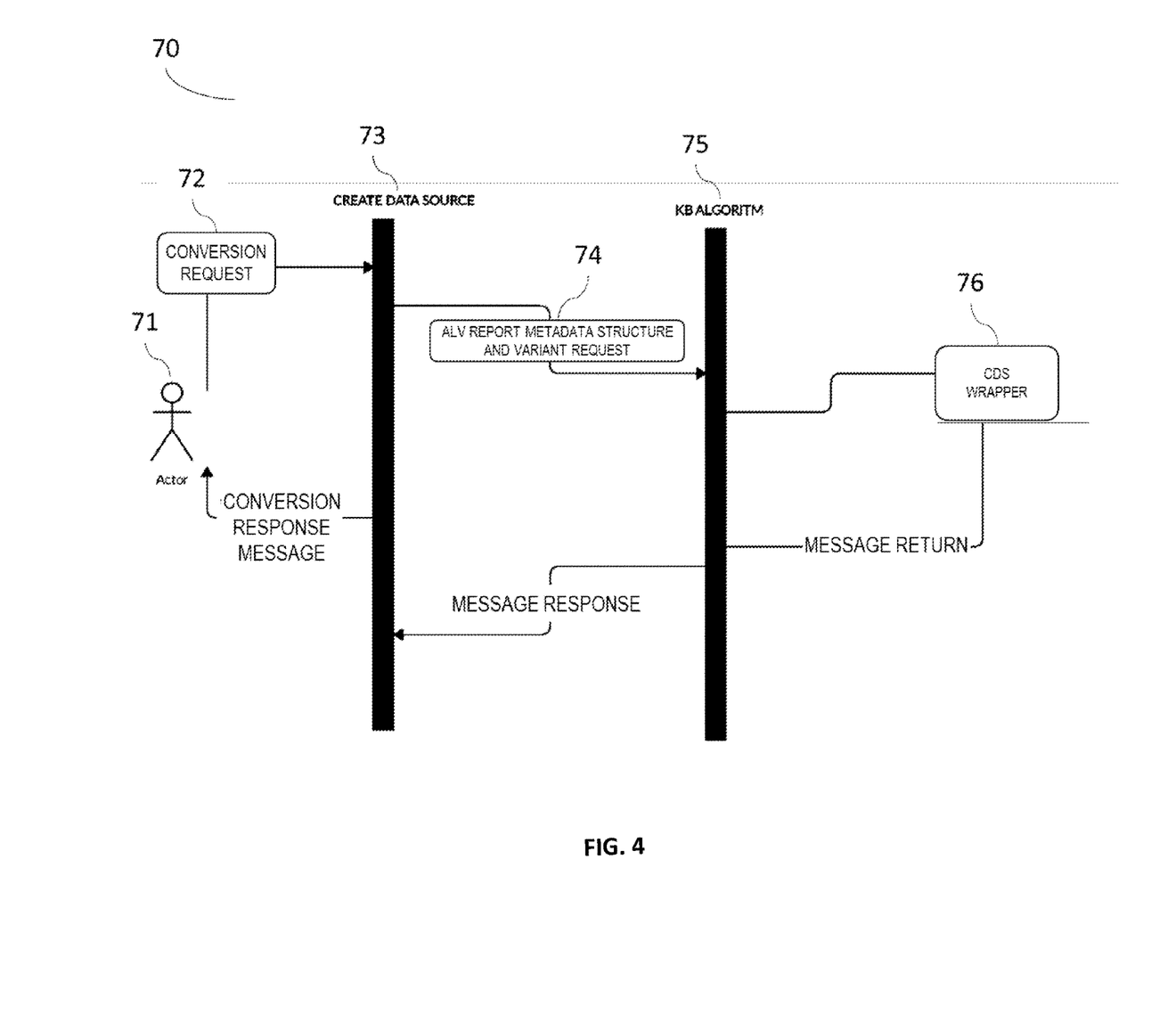
FIG. 4 shows a high-level flow diagram of a process for converting an ALV report request to an SAPUI5 report.

Reference is now made to FIG. 4, showing a high-level flow diagram 70 of a process for converting an ALV report request to an SAPUI5 report. A conversion request 72 originates from a user/developer 71. A data source is created 73. The data source comprises metadata structure of an ALV ABAP report and variant request 74; the variant request specifies output filters, if any, of the ALV ABAP report. A conversion algorithm 75 converts the metadata structure 74 to a CDS wrapper 76. The CDS wrapper 76 has the same structure as the metadata structure and the same form a standard SAP CDS. However, it does not contain any data—the CDS wrapper 76 shall be populated with data during runtime.

Figure 5:
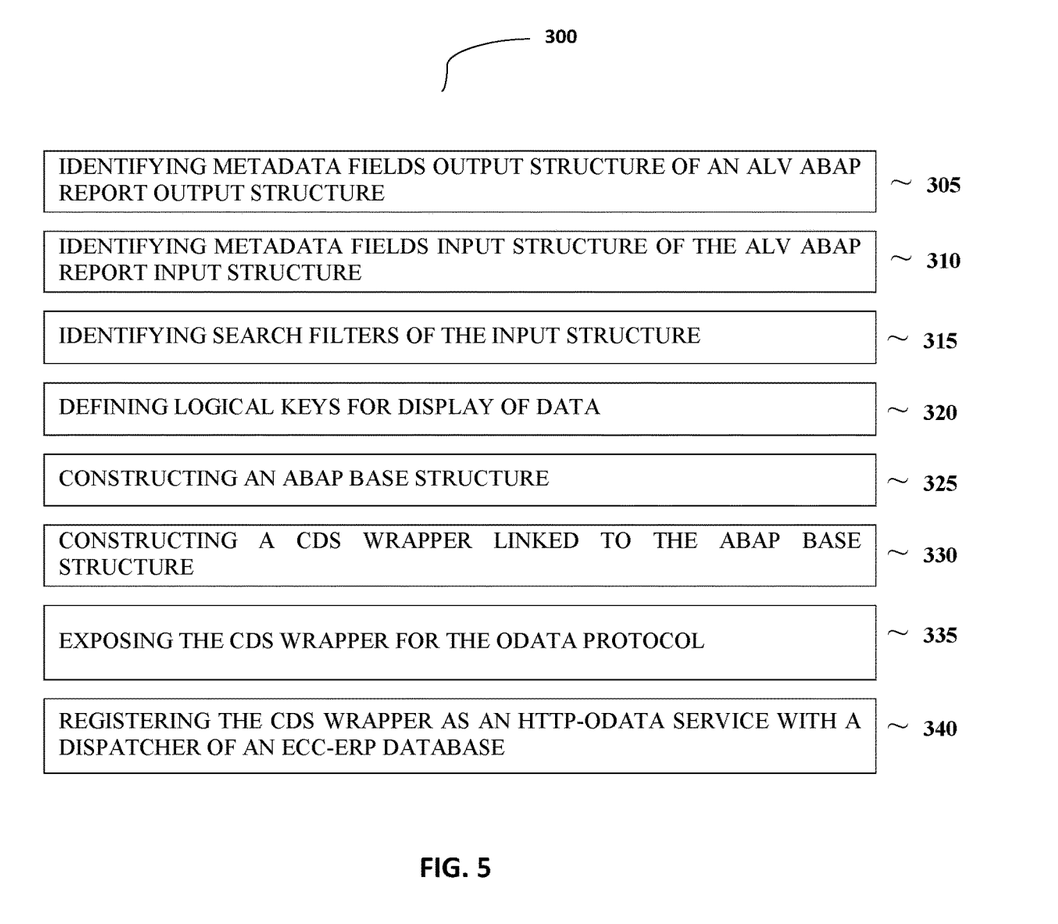
FIG. 5 shows a detailed list of steps of a process 300 for creating a CDS wrapper.

Reference is now made to FIG. 5, showing a detailed list of steps of a process 300 for creating a CDS wrapper. The process comprises a. Steps 300 for establishing a CDS wrapper:
   i. identifying metadata fields of an output structure of an ALV ABAP report 305;
   ii. identifying metadata fields of an input structure of the report 310;
   iii. defining one or more logical keys for display of data;
   iv. constructing an ABAP base structure comprising the metadata fields of the output structure;
   v. constructing a CDS wrapper linked to the ABAP base structure;
   vi. exposing the CDS wrapper for the ODATA protocol; and
   vii. registering the CDS wrapper as an HTTP-ODATA service with a dispatcher of an SAP ECC-ERP database.

Figure 6:
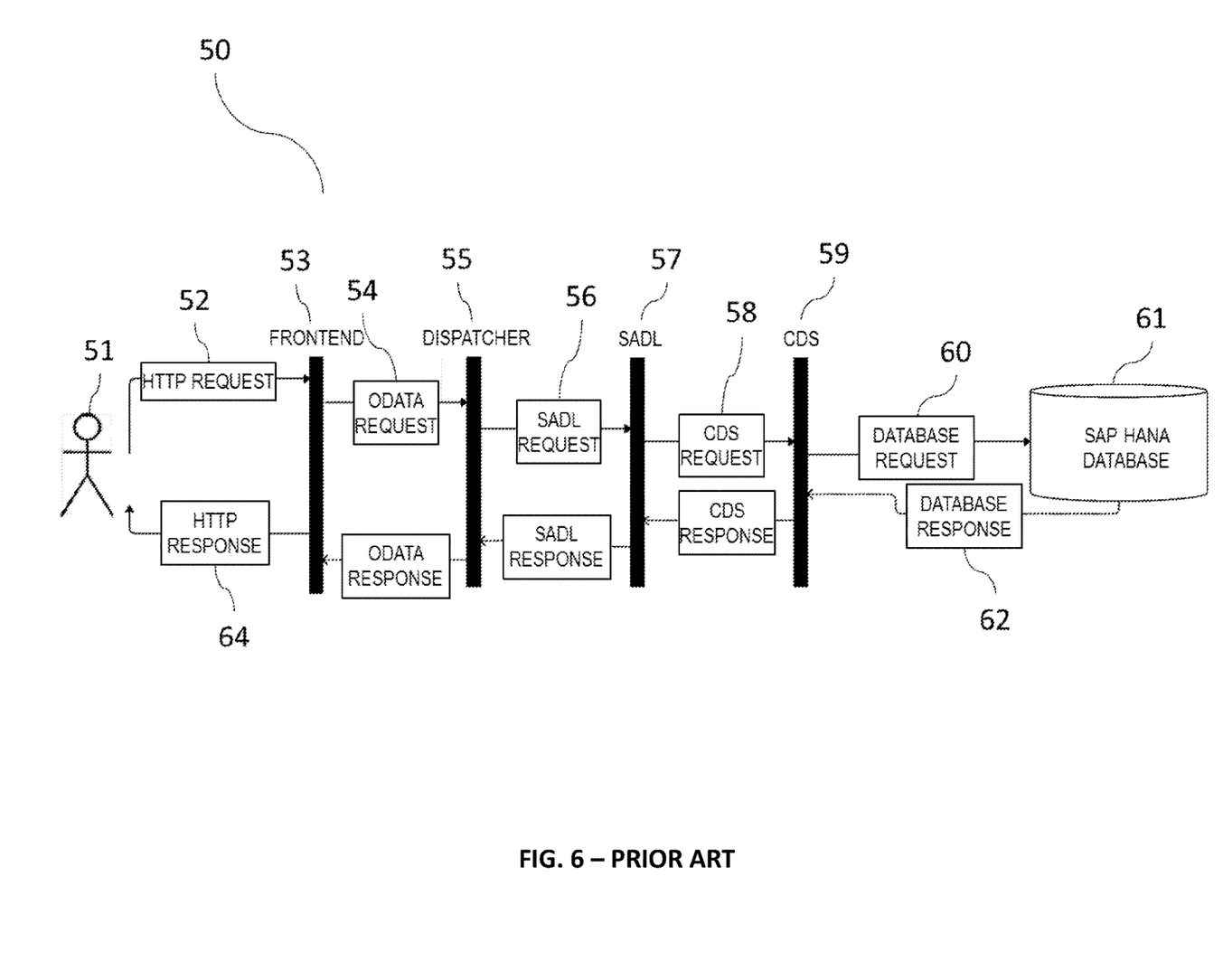
FIG. 6 shows workflow diagram for an SAPUI5 report request/response runtime process according to the SAP ABAP Fiori programming model.

Reference is now made to FIG. 6, showing a workflow diagram for an SAPUI5 report request/response runtime process 50 according to the SAP ABAP Fiori programming model. A user/developer 51 initiates an HTTP request 52 at the frontend interface 53. The frontend 53 generates an ODATA request 54, which flows to the dispatcher 55. The dispatcher 55 generates an SADL request 56, which flows to the SADL 57. The SADL 57 generates a CDS request 58, which flows to the CDS 59. The CDS module 59 generates a database request 60 which enters an SAP HANA ERP database 61. The database response 62 flows back to the CDS module 59 and responses are generated and flow in reverse order of the requests until an HTTP response 64 reaches the user/developer 51.

Figure 7:
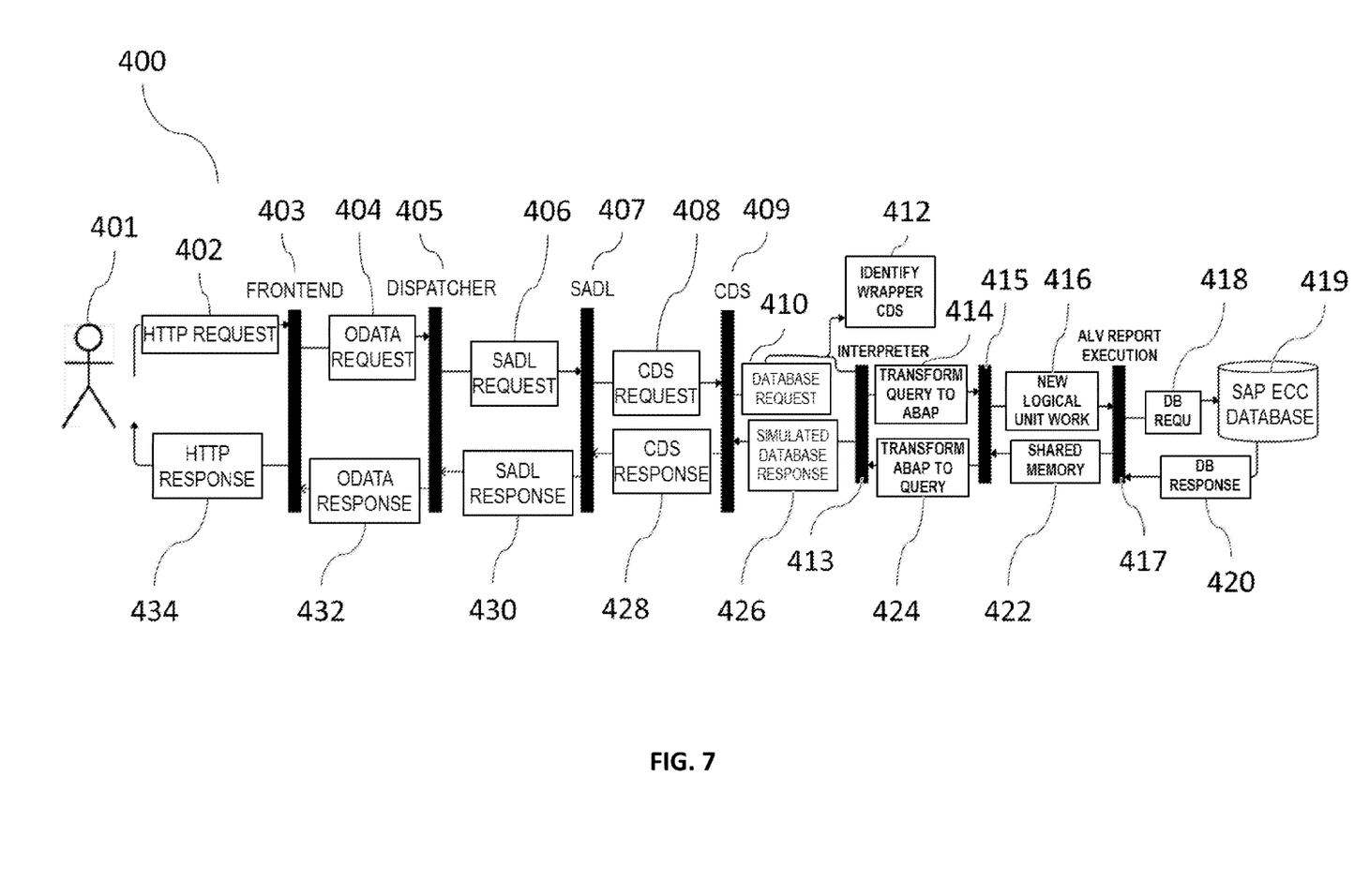
FIG. 7 shows a workflow diagram for a report request/response runtime process according to some embodiments of the present invention.

Reference is now made to FIG. 7, showing a workflow diagram for a report 330 request/response runtime process 400 according to some embodiments of the present invention. The flow from the user/developer 401 and HTTP request 402 at the frontend 403, until the CDS request 408 at the CDS module 409, is similar to the SAPUI5 flow. However, a call to use the wrapper CDS 76 (see FIG. 4)—created before runtime (see FIG. 5)—is embedded in the HTTP request 402.

When the wrapper CDS 76 is identified 412 in the database request 410 from the CDS module 409, the database request 410 is intercepted and forwarded to a conversion interpreter 413. The conversion interpreter 413 transforms the (JSON) query request to ABAP 414, and then an interface module 415 (interfacing between the conversion interpreter 413 and the legacy ALV/ECC environment in a new LUW) produces a new thread, comprising a new logical work unit 416. The new logical work unit 416 is fed to a 340 legacy SAP ALV report execution module 417, which forwards the database request to the SAP legacy ECC database 419 and receives the database response 420 from the database 419.

The DB response 420 is allocated to a shared memory 422 and transformed from ALV (ABAP) back to the query (JSON) to be deployed 424. The conversion interpreter 413 converts the query to a simulated database response 426. The simulated response 426 is then fed back to the CDS module 409 and query merges back to the original flow.

Instructions for the invention's processes described above are in the form of instructions to one or more processors stored on one or more non-transitory computer-readable media (CRMs). A person skilled in the art will know how to select among correct and/or optimal CRMs (storage media and/or memory in which to place the instructions and/or indirections thereto.

The invention claimed is:

1. A computer-implemented process for developing a customized application on an SAP platform, comprising:
   a. a hardware processor execute a user steps for creating the application behavior, comprising:
      i. creating a customized application;
      ii. selecting one or more data sources;
      iii. defining relationships between the data sources;
      iv. associating business rules, defined in Advanced Business Application Programming (ABAP) code, with frontend interface behaviors through dynamic annotations, wherein the dynamic annotations are automatically generated to enable frontend interface rendering compliant with SAP Fiori design and SAP clean core architecture;
      v. selecting master data, from the data sources, to be displayed; and
      vi. for each screen of detail data to be displayed, selecting the detail data from the master data; and
   b. a system automatically execute steps for constructing application, comprising:
      i. constructing a master structure comprising metadata fields of the master data;
      ii. constructing a general core data service (CDS) comprising the master data and the detail data;

iii. constructing a first specific CDS comprising the master structure populated by the general CDS;
iv. allocating the database response to shared memory for improved data access performance;
v. linking the screen actions to the business rule, by constructing a specific business object processing framework (BOPF) configured for management of calls of each screen action, employing the master structure;
vi. adjusting method parameters for each class associated with each screen action, formulating parameters of the master structure; and
vii. for each of the detail data, constructing a second specific CDS;
wherein the process enables dynamic SAP Fiori screen generation from ABAP-defined business logic without altering core SAP system code, maintaining compliance with SAP clean core principles and supporting upgradability; and
wherein the process integrates a real-time, in-memory data management module that synchronizes transactional records across a plurality of SAP modules, ensuring consistent cross-functional data access and enabling automated process execution without manual intervention.

2. The computer-implemented process of claim 1, wherein the step of creating a customized application comprises:
a. selecting or creating a customized application template; and
b. adding basic information to the application template.

3. The computer-implemented process of claim 1, wherein the data sources comprise physical tables, SAP CDSs.

4. The computer-implemented process of claim 1, wherein the user steps further comprises defining one or more filters on the data sources.

5. The computer-implemented process of claim 1, wherein at least one of the steps of selecting master data and selecting detail data from the master data is implemented by drag-and-drop.

6. One or more non-transitory computer-readable media (CRMs), storing instructions to one or more processors for implementation of a process for developing a customized application on an SAP platform, comprising
a. the one or more processors execute user steps for creating the application, comprising:
i. creating a customized application;
ii. selecting one or more data sources;
iii. defining relationships between the data sources;
iv. associating business rules, defined in Advanced Business Application Programming (ABAP) code, with frontend interface behaviors through dynamic annotations, wherein the dynamic annotations are automatically generated to enable frontend interface rendering compliant with SAP Fiori design and SAP clean core architecture;
v. selecting master data, from the data sources, to be displayed; and
vi. for each screen of detail data to be displayed, selecting the detail data from the master data; and
b. a system automatically execute steps for constructing building the user-created application, comprising:
i. constructing a master structure comprising metadata fields of the master data;
ii. constructing a general core data service (CDS) comprising the master data and the detail data;
iii. constructing a first specific CDS comprising the master structure populated by the general CDS;
iv. allocating the database response to shared memory for improved data access performance;
v. linking the screen actions to the business rule, by constructing a specific business object processing framework (BOPF) configured for management of calls of each screen action, employing the master structure;
vi. adjusting method parameters for each class associated with each screen action, formulating parameters of the master structure; and
vii. for each of the detail data, constructing a second specific CDS;
wherein the process enables dynamic SAP Fiori screen generation from ABAP-defined business logic without altering core SAP system code, maintaining compliance with SAP clean core principles and supporting upgradability; and
wherein the process integrates a real-time, in-memory data management module that synchronizes transactional records across a plurality of SAP modules, ensuring consistent cross-functional data access and enabling automated process execution without manual intervention.

7. The one or more CRMs of claim 6, wherein the step of creating a customized application comprises
a. selecting a customized application template; and
b. adding basic information to the application template.

8. The one or more CRMs of claim 6, wherein the data sources comprise physical tables, SAP CDSs.

9. The one or more CRMs of claim 6, wherein the user steps further comprises defining one or more filters on the data sources.

10. The one or more CRMs of claim 6, wherein at least one of the steps of selecting master data and selecting detail data from the master data is implemented by drag-and-drop.

* * * * *